United States Patent
Hua

(10) Patent No.: US 6,427,724 B2
(45) Date of Patent: Aug. 6, 2002

(54) APPARATUS FOR CONSERVING THERMAL ENERGY IN A CENTRAL HEATING SYSTEM

(75) Inventor: Li Shan Hua, Ji Lin (CN)

(73) Assignee: Zhuhai Velocity of Sound Technology Limited (CN)

( * ) Notice: Subject to any disclaimer, the term of this patent is extended or adjusted under 35 U.S.C. 154(b) by 0 days.

(21) Appl. No.: 09/729,826

(22) Filed: Dec. 6, 2000

(30) Foreign Application Priority Data

Dec. 10, 1999 (CN) ........................................ 99241050 U

(51) Int. Cl.$^7$ ........................... G05D 11/03; B01F 15/02
(52) U.S. Cl. ..................................... 137/888; 366/163.2
(58) Field of Search ............................... 137/888, 889, 137/890; 366/163.2

(56) References Cited

U.S. PATENT DOCUMENTS

| | | | |
|---|---|---|---|
| 1,195,915 A | * 8/1916 | Damrow | ................. 137/888 X |
| 2,694,404 A | * 11/1954 | Luft et al. | ...................... 137/1 |
| 5,323,967 A | * 6/1994 | Tanaka et al. | ........... 239/417.3 |
| 5,544,961 A | * 8/1996 | Fuks et al. | ................ 366/163.2 |
| 6,299,343 B1 | * 10/2001 | Pekerman | ................ 366/163.2 |

\* cited by examiner

Primary Examiner—Kevin Lee
(74) Attorney, Agent, or Firm—Blank Rome LLP

(57) ABSTRACT

An energy saving heat transfer unit providing an efficient means to transfer energy from steam to water in a central heating system. The steam enters a mixing chamber and creates a negative pressure environment. Water in a backwater pipe, which is at a lower temperature and pressure, is than is absorbed into the mixing chamber where energy is passed from the steam to the water. The heated water then exits the heat transfer unit and goes back into the heating system. After being cooled in the heating system, the water then reenters the heat transfer unit at the backwater pipe and continues the cycle over again.

5 Claims, 1 Drawing Sheet

APPARATUS FOR CONSERVING THERMAL ENERGY IN A CENTRAL HEATING SYSTEM

BACKGROUND OF THE INVENTION

Field of the Invention

The invention concerns heating equipment, to be specific, it is a supersonic 3-way super energy-saving unit.

SUMMARY OF THE INVENTION

Ordinary central heating system realizes central heating supply to users by making use of circulating pump to keep the water in a user system circulated continuously and at the same time heating the circulating water with steam through thermal converter. The water in such system is indirectly heated by a thermal source of steam, thus the thermal efficiency is relatively low. Particularly, the kinetic energy (pressure of steam), half of the energy in the steam is wasted in the system.

This utility model is designed to solve the above-mentioned problem by providing a supersonic 3-way super energy-saving unit.

The feature of this super unit is composed of a flange at the steam inlet, a flange at the backwater intake, a flange at the water exit and a main body. The flange at the steam inlet is connected with the body. Close to the inlet flange inside the body there is a nozzle with a critical jet at its tip. Close to the jet there is a mixing chamber which is linked with a mixing tube to a diffusion cubicle. The cubicle is connected with the water exit flange. The backwater intake flange is connected with the body at the nozzle.

Both nozzle and mixing chamber are funnel like and critical jet is trumpet shaped while mixing tube is a circular tube and diffusion cubicle is in an expanded bell shape.

This utility model is a heating and compressing unit powered with steam. The steam with certain pressure ejects from the jet at a very high speed and comes into the mixing chamber. Meanwhile, the pressure is reduced at the exit of the jet, producing a negative pressure, with which the water at low temperature and pressure from backwater pipe is absorbed into the chamber. Exchange of heat and momentum between the two flows is carried out in the chamber, namely, steam passes heat to backwater to increase water temperature and passes momentum and energy to backwater to increase pressure and potential energy. When leaving the mixing chamber the mixed flow has become hotter water at a uniform speed before entering into diffusion cubicle, to reduce its flow gradually while rise its pressure continuously. As result, hot water with certain pressure and temperature is obtained. Under the action of pressure hot water comes to the thermal circulation system from water exit for heat supply, and then enters into this energy-saving unit from backwater intake and continues circulation and heat supply after water temperature drops.

Thanks to direct contact of thermal source of steam and the water to be heated the thermal efficiency is improved, especially, the system makes full use of another half of the energy—kinetic energy (steam pressure), directly converting it into the pressure to drive the heated water continue its self-circulation. As a result of the advanced function circulation pump is saved as well as the fund.

BRIEF DESCRIPTION OF THE DRAWING

The FIGURE is a sectional view of the utility model structure.

DETAILED DESCRIPTION OF THE INVENTION

Figure 1:
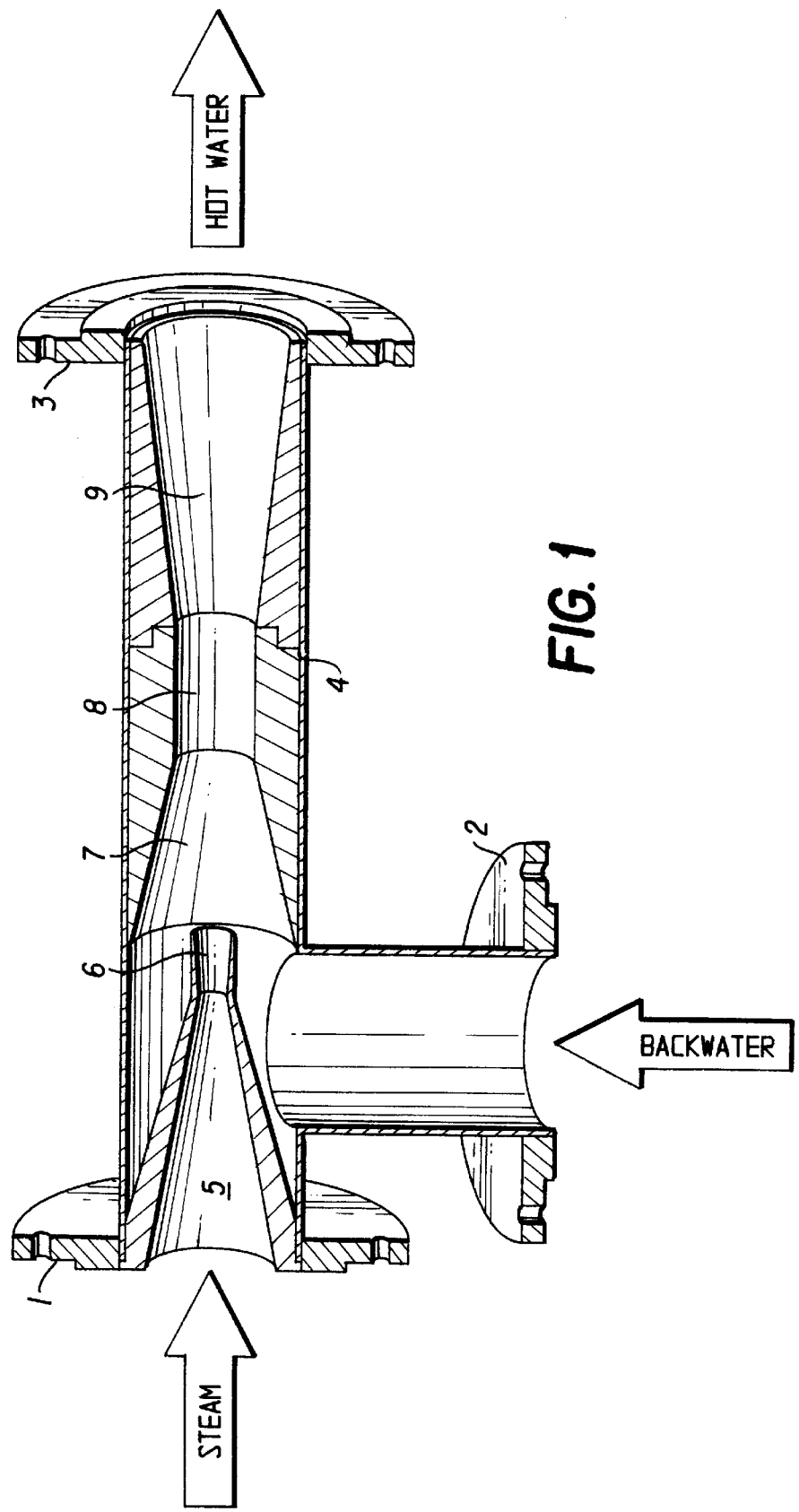

As shown in the FIGURE are steam inlet flange 1, backwater intake flange 2, water exit flange 3, the main body 4, funnel-shaped nozzle 5, trumpet-like critical jet 6, funnel-shaped mixing chamber 7, circular mixing tube 8, and expanded bell-shaped diffusion cubicle 9.

This supersonic 3-way super energy-saving system is composed of a flange at the steam inlet 1, a flange at the backwater intake 2, a flange at the water exit 3, and main body 4. The flange at the steam inlet 1 is connected with the body 4. Close to the steam inlet flange 1 inside the body 4 there is a funnel-shaped nozzle 5 with a trumpet-like critical jet 6 at its tip. Close to the jet there is a funnel-like mixing chamber 7 which is linked with a circular mixing tube 8 to an expanded bell-like diffusion cubicle 9. The cubicle is connected with the water exit flange 3. The backwater intake flange 2 is connected with the body 4 at the funnel-shaped nozzle 5.

This unit is expected to be widely used in thermal and heated water supply system both in industrial and civil buildings and it is fully possible to replace the traditional thermal converters and circulating pumps.

In the mixing process of steam and water inside the body of the utility model system the mixed fluid can reach a supersonic speed due to the increase of compression coefficient and both fluids shall not consume mechanic energy in the transmission process of thermal energy and kinetic energy. Heating and compressing are carried out instantaneously, finally, realizing the purpose of fluid heating and compressing.

What is claimed is:

1. A supersonic 3-way super energy-saving unit comprising:
   a main body having a steam inlet, a backwater intake, and a water exit;
   a nozzle with a trumpet-like critical jet at its tip located inside the body proximate to the steam inlet, a mixing chamber located adjacent to the jet, a mixing tube located adjacent to the mixing chamber, and a diffusion cubicle located adjacent to the mixing tube; and
   a steam inlet flange connected to the main body adjacent to the steam inlet, a backwater intake flange connected to the body at a nozzle, and a water exit flange connected to the body adjacent to the diffusion cubicle.

2. As claim 1 described the supersonic 3-way super energy saving unit is featured with a funnel-shaped nozzle.

3. As claim 1 described the supersonic 3-way super energy saving unit is featured with a funnel-shaped mixing chamber.

4. As claim 1 described the supersonic 3-way super energy saving unit is featured with a circular mixing tube.

5. As claim 1 described the supersonic 3-way super energy saving unit is featured with an expanded bell-shaped diffusion cubicle.

* * * * *